US012118680B2

(12) United States Patent
Lessman (10) Patent No.: US 12,118,680 B2
(45) Date of Patent: Oct. 15, 2024

(54) AUGMENTED REALITY LENS SELECTIVE TINT ADJUSTMENTS

(71) Applicant: HEWLETT-PACKARD DEVELOPMENT COMPANY, L.P., Spring, TX (US)

(72) Inventor: Mark Allen Lessman, Fort Collins, CO (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 90 days.

(21) Appl. No.: 17/974,105

(22) Filed: Oct. 26, 2022

(65) Prior Publication Data

US 2024/0144605 A1    May 2, 2024

(51) Int. Cl.
*G06T 19/00* (2011.01)
*G02B 27/01* (2006.01)
*G02C 7/10* (2006.01)
*G06T 7/11* (2017.01)
*G06V 10/25* (2022.01)
*G06V 10/60* (2022.01)

(52) U.S. Cl.
CPC ........ *G06T 19/006* (2013.01); *G02B 27/0172* (2013.01); *G02C 7/105* (2013.01); *G06T 7/11* (2017.01); *G06V 10/25* (2022.01); *G06V 10/60* (2022.01); *G02B 2027/0178* (2013.01)

(58) Field of Classification Search
None
See application file for complete search history.

(56) References Cited

U.S. PATENT DOCUMENTS

2020/0074724 A1* 3/2020 Mathur .............. G02B 27/0172
2020/0111259 A1* 4/2020 Sears ................. G02B 27/0172

* cited by examiner

*Primary Examiner* — Frank S Chen
(74) *Attorney, Agent, or Firm* — Quarles & Brady LLP (57) ABSTRACT

In an example in accordance with the present disclosure, an augmented reality (AR) display device is described. The AR display device includes a frame to be worn on a head of a user and a lens disposed within the frame. A user is to view a physical scene through the lens. The lens includes multiple regions. Each region is individually addressable and has a tint value that is individually adjustable. The AR display device also includes an input to receive virtual content to be presented on the lens and an imaging system to present the virtual content on the lens. The AR display device also includes a controller which 1) identifies a first region of the lens on which the virtual content is to be presented and 2) selectively adjusts a tint of the first region while suppressing a tint adjustment to a second region of the transparent lens.

18 Claims, 7 Drawing Sheets

AUGMENTED REALITY LENS SELECTIVE TINT ADJUSTMENTS

BACKGROUND

Augmented reality (AR) systems combine real-world objects and virtual objects to create an immersive environment for a user. For example, AR display devices include a transparent lens through which a user views the physical environment. The AR display device projects virtual imagery onto the transparent lens, thus enriching the view of the physical scene with virtual elements. In some cases, a user may interact with the computer-generated objects within the environment.

BRIEF DESCRIPTION OF THE DRAWINGS

The accompanying drawings illustrate various examples of the principles described herein and are part of the specification. The illustrated examples are given merely for illustration, and do not limit the scope of the claims.

Throughout the drawings, identical reference numbers designate similar, but not necessarily identical, objects. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

Augmented reality (AR) systems include systems and devices that implement direct and/or indirect displays of a physical, real-world environment whose objects are augmented by computer-generated imagery. AR systems use specialized lens to project virtual imagery into a user's field of view without occluding the real-world objects visible through the lens. In this way, the user experiences the real world as augmented with virtual imagery and/or objects. Such AR systems may include eyeglass-type frames that place the specialized lens in front of the user's eyes.

Extended reality (XR), of which AR is a sub-class, is emerging as a desirable computing platform for facilitating communication as XR may enhance collaboration; present information in a palatable, enjoyable, and effective manner; and introduce new immersive environments for entertainment, productivity, or other purposes. XR systems are found in many industries including healthcare, telecommunication, education, and training, among others. While XR systems undoubtedly have changed, and will continue to change, the way individuals communicate, some technological advancements may further increase their impact on society.

For example, viewability of the virtual imagery depends on the real-world lighting conditions. When the real-world ambient light is bright (e.g., outdoors on a sunny day), the visual experience of the virtual imagery may be degraded as the bright ambient light may wash out the virtual imagery. In other words, the amount of available ambient light affects, either positively or negatively, a viewability of the virtual content superimposed over a physical environment.

While virtual content brightness may be amplified, this may not fully offset the negative impact of a brightly lit environment. For example, the optical features of the AR glasses reduce the amount of light available to illuminate the virtual content. That is, to project the virtual content, AR glasses include optical components such as reflective coatings, polarizing elements, waveguides and/or beam splitters. Light waves passing through these elements lose strength such that the overall brightness of virtual content may be 50% or more reduced from the intended initial brightness. Moreover, increasing the display brightness draws more power, which makes such devices less energy efficient.

While this may be accounted for with darkened lenses or shades attached to the AR system, such darkening elements provide another component to the AR system, which increase the weight and complexity of use of these types of AR systems. Moreover, darkening may make the physical world more difficult to see through the lens. That is, the darkened lenses or shades that reduce the light passing through the AR lenses reduce the illumination of real-world objects. As such, present AR display devices present a tradeoff between prioritizing viewability of the virtual content and viewability of the physical environment through the AR glasses.

Accordingly, the present specification describes devices, methods, and computer program products that provide localized adjustment of tint of the AR glasses. Specifically, those areas with virtual content presented thereon may be tinted while those regions that do not have virtual content presented thereon may be maintained at full transparency. As such, the present AR display device provides for the enhanced viewing of virtual content while not degrading the viewability of real-world content through the AR display device. This is done by dividing the lens into regions, each of which may be individually addressed and may have a respective tint level that is individually adjusted. That is, the present AR display device enhances contrast in smaller areas of the lenses to increase contrast for virtual images without degrading viewability of the real-world objects through the AR display device. The size of each region may range from a single pixel to up to larger areas covering ¼ to ½ of the lens. The present AR display device also includes hardware and computer-readable storage medium to store an instruction set to selectively adjust a tint of each region of the lens.

Specifically, the present specification describes an AR display device. The AR display device includes 1) a frame to be worn on a head of a user and 2) a lens disposed within the frame through which a user views a physical scene. The lens includes multiple regions. Each region is individually addressable and the tint in each region is individually adjustable. The AR display device also includes an input to receive virtual content to be presented on the lens and an imaging system to present the virtual content on the lens. A controller of the AR display device 1) identifies a first region of the lens on which the virtual content is to be presented and 2) selectively adjusts a tint of the first region by applying an electrical potential to produce an electric field across the first region while suppressing a tint adjustment to a second region of the lens.

The present specification also describes a method. According to the method, virtual content is presented on a lens of an AR display device. As described above, the lens includes multiple regions where each region is individually addressable. Also, a tint in each region is individually adjustable. The controller of the AR display device determines a first region of the lens on which the virtual content is presented and applies an electrical potential to produce an electric field across to the first region. The applied electrical potential selectively adjusts a tint of the first region while maintaining a second region at full transparency.

The present specification also describes a non-transitory machine-readable storage medium encoded with instructions executable by a processor. The machine-readable storage medium includes instructions to, when executed by the processor, cause the processor to present virtual content on a lens of an AR display device. As described above, the lens has multiple regions, each of which is individually addressable and for which a tint is individually adjustable. The machine-readable storage medium includes instructions to generate a mapping between pixel addresses of the virtual content to regions of the lens and determine a first region of the lens on which the virtual content is to be presented. The machine-readable storage medium also includes instructions to increase contrast between a physical scene viewable through the lens and the virtual content in the first region. This may be done by 1) applying an electrical potential to the first region and 2) suppressing an electrical potential to a second region where virtual content is not to be presented.

In summary, such a device, method, and machine-readable storage medium may, for example, 1) provide a target contrast between virtual content and real-world physical objects viewable through an AR display device; 2) is lightweight; 3) automatically adjusts the contrast without user intervention; 4) localizes the target display conditions for virtual content to regions surrounding the virtual content, and 5) leaves non-virtual content regions of the lens unaffected by the reduced light. However, it is contemplated that the devices disclosed herein may address other matters and deficiencies in a number of technical areas.

As used in the present specification and in the appended claims, the term "controller" refers to a component that includes a processor and a memory device. The processor includes the circuitry to retrieve executable code from the memory and execute the executable code. As specific examples, the controller as described herein may include machine-readable storage medium, machine-readable storage medium and a processor, an application-specific integrated circuit (ASIC), a semiconductor-based microprocessor, and a field-programmable gate array (FPGA), and/or other hardware device.

As used in the present specification and in the appended claims, the term "memory" or "memory device" includes a non-transitory storage medium, which machine-readable storage medium may contain, or store machine-usable program code for use by or in connection with an instruction execution system, apparatus, or device. The memory may take many forms including volatile and non-volatile memory. For example, the memory may include Random-Access Memory (RAM), Read-Only Memory (ROM), optical memory disks, and magnetic disks, among others. The executable code may, when executed by the respective component, cause the component to implement the functionality described herein. The memory may include a single memory object or multiple memory objects.

As used in the present specification and in the appended claims, the term "a number of" or similar language is meant to be understood broadly as any positive number including 1 to infinity.

Figure 1:
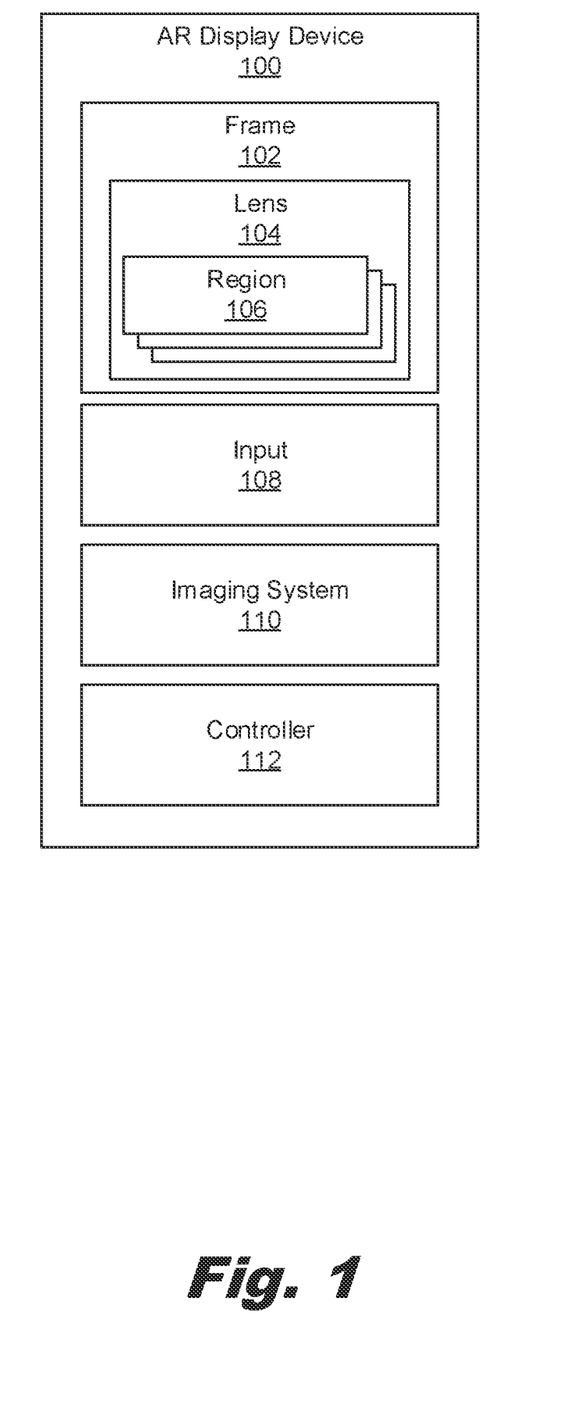
FIG. 1 is a block diagram of an AR display device with independently adjustable tint regions, according to an example of the principles described herein.

Turning now to the figures, FIG. 1 is a block diagram of an AR display device (100) with independently adjustable tint regions, according to an example of the principles described herein. As described above, improper contrast between the ambient environment light and the virtual content may render the virtual content unrecognizable. That is, ambient light may wash out the virtual content. The present AR display device (100) with individually-controllable tint regions (106) addresses this and other issues.

Figure 2:
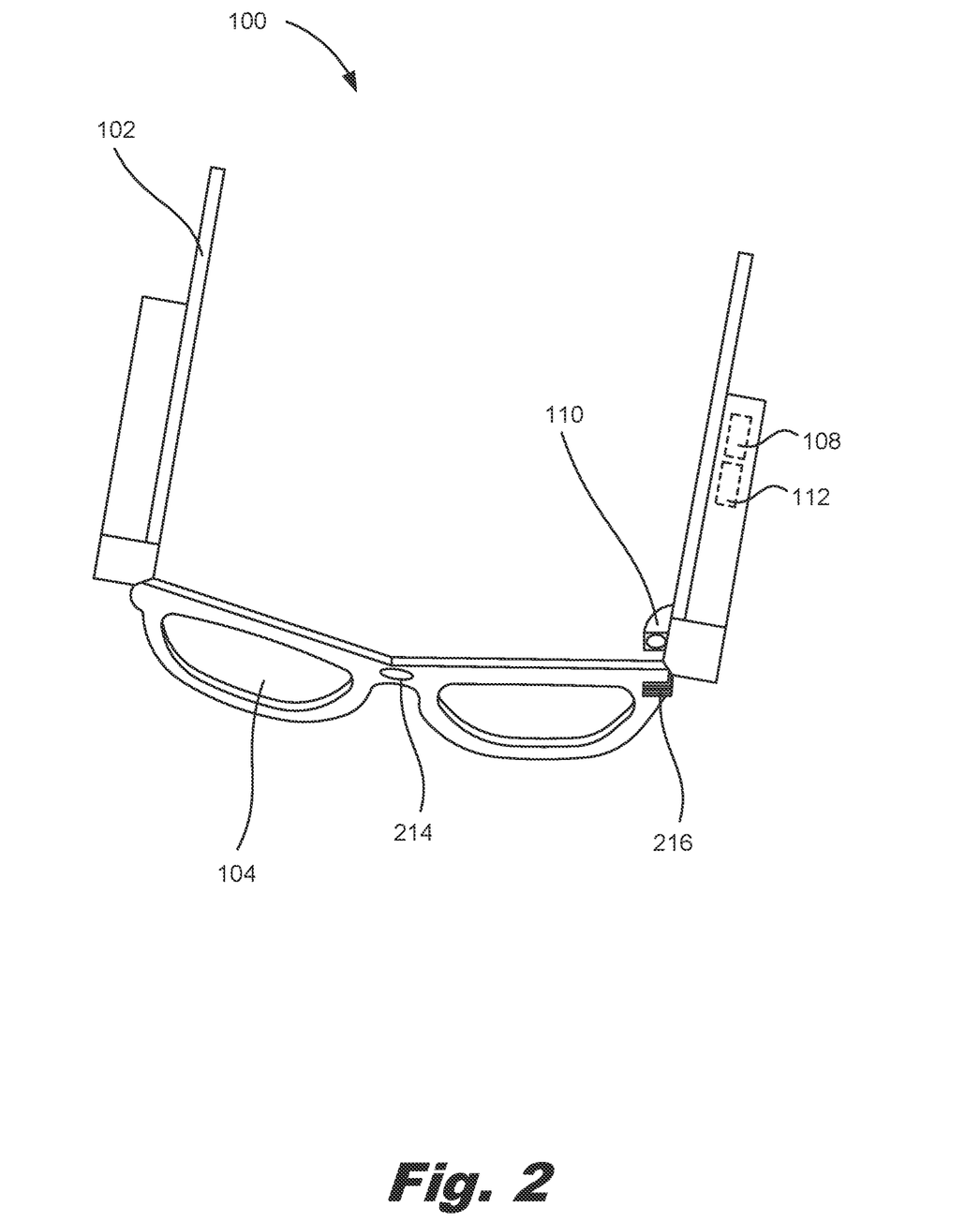
FIG. 2 is a diagram of the AR display device with independently adjustable tint regions, according to an example of the principles described herein.

As described above, one form of XR is augmented reality (AR) where virtual elements are presented on a lens (104) through which the user views a physical scene. As such, the AR display device (100) includes the lens (104) and a frame (102) to retain the lens (104) in front of the user. FIG. 2 depicts the lens (104) and the frame (102) as described herein.

The lens (104) may have a selectively alterable tint. That is, an applied stimulus alters the properties of the lens (104) to change the light transmissivity through the lens (104). The change in tint affects the viewability of the virtual content displayed on the lens (104). For example, in a bright environment, it may be difficult to see lens-projected virtual content due to a lack of contrast between the ambient light and the virtual content. Accordingly, by changing the tint, the contrast between light that reaches the user through the lens (104) and the virtual content is increased, which makes the virtual content more discernible.

The lens (104) may take a variety of forms and includes components such as a transparent substrate, waveguides, coatings, and electrical traces that facilitate the presentation of virtual content and that facilitate tint adjustment to the lens (104). Depending on the form, or type, of lens (104), a tint adjustment may occur in a variety of ways. For example, the lens (104) may be a transparent liquid-crystal display (LCD). In an LCD lens, light-modulating properties of liquid crystals are used to produce color or monochrome text and/or images. A transparent LCD lens (104) includes a polarizing layer both in front of and behind a layer of liquid crystals. The crystals may be switched "on" or "off." When in an "off" state, the liquid crystals rotate the light passing through, effectively allowing light to flow through. In an "on" state, the liquid crystals do not rotate in which case light passing through the lens (104) is blocked by the polarizing layers. As such, the tint of the lens (104) may be adjusted by switching the crystals between the "on" and "off" state. An LCD lens (104) may take a variety of forms including a twisted nematic (TN) type LCD lens (104) wherein twisted crystals are switched between the "on" and "off" state by untwisting and twisting the liquid crystals.

In another example, the lens (104) may be a polymer-dispersed liquid crystal (PDLC)-type lens (104) that includes a glass or other clear substrate with a polymer-dispersed liquid crystal (PDLC) layer disposed over the glass or other clear substrate. In the PDLC layer, liquid crystals are dispersed in a polymer. When no electrical potential is applied, the light is scattered at the interface of the layer due to the liquid crystals not being aligned with one another. In such a light scattering state, the lens (104) is opaque. However, when an electrical potential is applied, the crystals align with one another and light passes more readily therethrough. In this state, the lens (104) is transparent. The degree of transparency/opacity is based on a value of the electrical potential passed through the lens (104).

In another example, the lens (104) may rely on the movement of lithium ions between electrodes to provide the selective tint. For example, the lens (104) may include sub-layers, including a separator between two electrodes. Lithium ions migrate back and forth between the electrodes within the separator. When the layer is transparent, the lithium ions reside against one electrode. When the layer is more opaque, the lithium ions reside against the other electrode. Applying an electrical potential drives the lithium ions from one electrode to the other or vice-versa.

Materials for the electrodes may vary. One electrode, the electrode against which the lithium ions sit when the lens (104) is transparent, may be formed of a material such as lithium cobalt oxide ($LiCoO_2$) or another such material. When an electrical potential is applied to the electrodes, the ions migrate through the separator to the other electrode, which may be a different material such as polycrystalline tungsten oxide ($WO_3$). The lithium ions cause the tungsten oxide layer to reflect light thus rendering this layer opaque. The lithium ions will remain on a particular electrode until the electrical potential is reversed. As such, no power is used to maintain a lithium-ion electrochromic lens (104) transparent or opaque. An applied electrical potential is just to change between states.

In a variation of this example, rather than having a separator between the electrode layers, the lens (104) may include an electrochromic material (i.e., a dye) that changes color when a current passes through. For example, a chemical die such as viologen may change reversibly between clear and blue/green. Accordingly, the tint may be selectively adjusted via an electrical potential which alters the amount of coloration in the electrochromic die that overlays the lens (104).

In yet another example, the lens (104) may be an electrochromic film or layer. An electrochromic film or layer is similar to PDLC in that it relies on the alignment/misalignment of rod-like particles to block or allow light to pass therethrough. The electrochromic film, like the PDLC layer, is switched based on an applied electrical potential. When there is no electrical potential applied to electrochromic glass, the liquid crystals are randomly oriented, scattering incident light and preventing transmission. That is, the lens (104) is opaque. However, when an electrical potential is applied, the liquid crystals align, allowing light to transmit through the lens (1040, rendering the lens (104) transparent. While reference is made to particular lens (104) tint adjusting mechanisms, a variety of tint-adjusting mechanisms may be implemented in accordance with the principles described herein.

Not only is the lens (104) tint adjustable, but the adjustments may be localized on the lens (104). That is, the lens (104) may be divided into multiple regions (106) each of which is individually addressable. That is, a region (106) of the lens (104) refers to an area on the lens (104) which is individually addressable and for which a tint is individually adjustable. Specifically, each region (106) is individually connected to an electrical source such that the electrical potential may be applied to each region (106) individually, which changes the tint in that region (106) using any of the aforementioned adjusting mechanisms or another adjusting mechanism. As such, based on the virtual content displayed thereon, some regions (106) are adjusted to increase a tint in that region (106) while other regions (106) are retained at full transparency. Accordingly, the AR display device (100) may include microscopic or transparent traces leading from the controller (112), which may be integrated into the frame (102), to each individually-addressable region (106) of the lens (104). In some examples, the regions (106) align with individual pixels of the image. In other examples, a region (106) may align with a grouping of pixels at some threshold granularity.

Each region (106) may be tint adjusted by varying degrees. That is, the tint in each region (106) may be defined along a scale from 0% to 100% where 0% represents no tint and the region (106) is fully transparent. By comparison 100% tint refers to a maximum tint or darkness for that region (106).

As described above, the tint of each region (106) may be determined based on the virtual content that is presented on the lens (104). Content that is displayed on the AR display device (100) may be provided by the AR display device (100) itself or a host computing device such as a personal computer (PC), all-in-one device, gaming console, or the like. Accordingly, the AR display device (100) includes an input (108) to receive the virtual content that is to be presented on the lens (104). Such an input (108) may include a wireless transceiver to wirelessly receive the virtual content or a physical port connectable to a content source provider. Note that while the present application relates to AR systems, the term virtual content is used to refer to the digital content presented in the AR environment, as opposed to the physical world objects, that may be viewable through the lens (104).

The AR display device (100) also includes an imaging system (110) to present the virtual content on the lens (104). The imaging system (110) may take a variety of forms. For example, the imaging system (110) may include a projection unit which projects the virtual content onto the lens (104). The imaging system (110) includes components such as projecting units, magnifying optics, gratings, beam splitters, and/or combiners to overlay virtual content on top of the scene of the real-world viewable through the lens (104). As one example, the imaging system (110) includes a projecting unit that projects an image onto a curved mirror that reflects the light into the user's eye. In another example, the imaging system (110) may include waveguides that direct the projected virtual content into the user's eye. While reference is made to specific imaging system (110) types, the imaging system (110) may be of any variety of types which presents content on a lens (104).

The AR display device (100) also includes a controller (112). As described above, the controller (112) refers to a combination of a processor(s) and a memory device. The processor executes instructions on the memory device to carry out an intended function.

Specifically, the controller (112) may identify a first region (106) of the lens (104) on which the virtual content is to be presented. That is, the controller (112) may ascertain where on the lens (104) the virtual content is to be presented such that the regions (106) of the lens (104) aligned with the virtual content may be tint-adjusted to ensure a desired contrast between the virtual content and the lens (104) upon which it is displayed. This may be done in a number of ways. For example, the virtual content that is to be presented on the lens (104) is made up of pixels, each pixel having a pixel address. The pixel addresses may be identified in the metadata or otherwise indicated in the raw data associated with the virtual content and provided by the content provider. The controller (112) performs operations to map these pixel addresses of the virtual content to regions (106) of the lens (104). That is, the regions (106), which may be organized as a grid, are physically aligned with the field of view of the lens (104) and the virtual content is projected onto the lens (104) in a fixed field such that the perceived field of view is precisely aligned on the lens (104). As such, the pixel locations that make up the virtual content may be precisely mapped to specific regions (106). In some examples, the grid may cover the entire field of view of the lens (104), while in other examples the grid of regions (106) may cover a portion of the field of view of the lens (104). For example, tint adjustment may be targeted to peripheral regions of the lens (104) while central regions of the lens (104) are not tint adjustable.

The controller (112) selectively adjusts a tint of the first region (106) by applying an electrical potential to produce the electric field across the first region (106) that results in an adjusted tint in the first region (106). As a particular example, the controller (112) may determine that pixel addresses of virtual content indicate the virtual content is to be presented on an upper lefthand corner of the field of view of the lens (104). Accordingly, the controller (112) may identify those regions (106) that correspond to the upper lefthand corner of the lens (104) and apply an electrical potential to darken those regions (106) and thus enhance the viewability of the virtual content presented thereon.

Figure 4A:
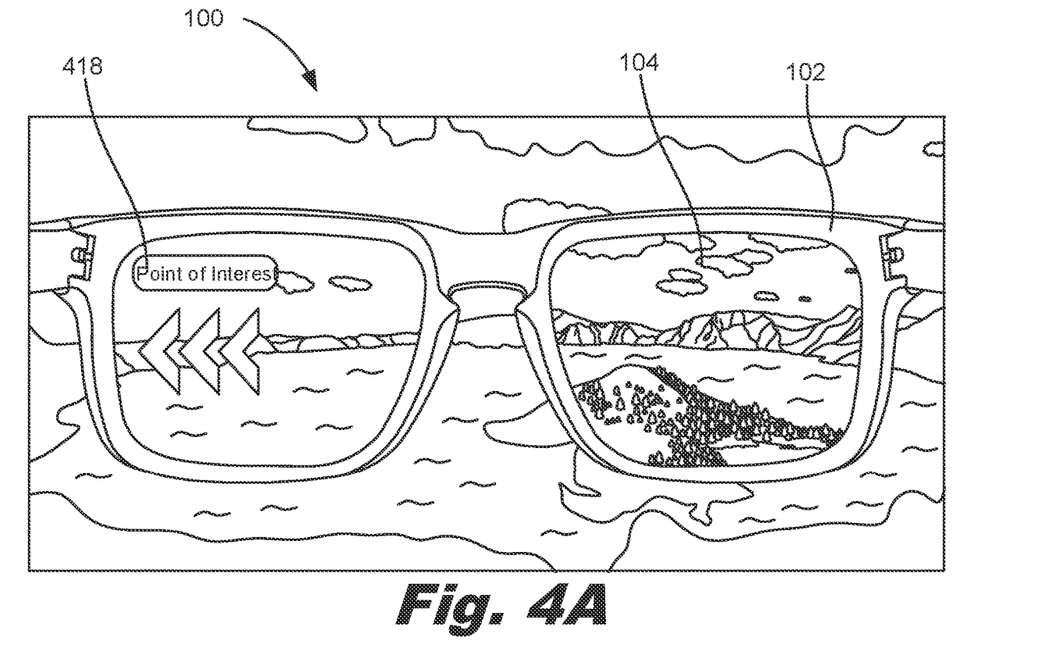
FIGS. 4A and 4B depict the selective tint adjustment on an AR display device, according to an example of the principles described herein.
Figure 4B:
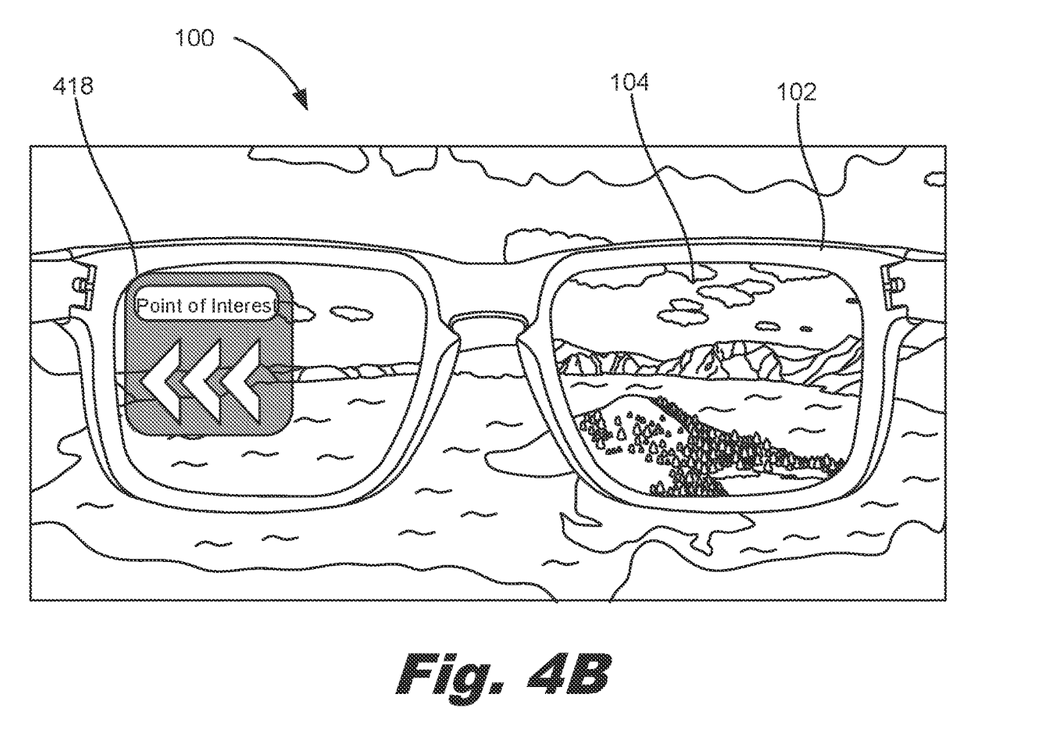

Note that as described above, the controller (112) makes this adjustment while suppressing a tint adjustment to a second region (106) of the lens (104). That is, the controller (112) adjusts the tint of the lens (104) per region (106), such that just those regions (106) where virtual content is presented are tinted, while those regions (106) where virtual content is not presented are maintained at full transparency, or are tinted to a lesser degree. Doing so ensures that 1) virtual content is presented with sufficient contrast to be easily discernible and 2) real-world content is not darkened to a degree where it is difficult to view. In other words, the controller (112) and region-specific tint adjustments allow for the optimized viewing of both real-world and physical objects in a single field of view. FIGS. 4A and 4B depict a visual example of the localized tinting of the lens (104) of the AR display device (100).

In some examples, the controller (112) determines a degree of tinting for each region (106) of the lens (104). That is, not only are the different regions (106) individually adjustable with respect to tint, but each region (106) may be adjusted to varying degrees. For example, applying no electrical potential may result in a 100% tint (i.e., a maximum darkness), applying a first electrical potential may set the tint to a first amount (e.g., 80%) resulting in less contrast, and applying a second electrical potential that is greater than the first electrical potential may set the tint even more (e.g., 50%) resulting in even less contrast. That is, the greater the electrical potential applied, the less tint exhibited on a corresponding region (106). As such, to maintain each region (106) with 0% tint, i.e., full transparency, an upper threshold electrical potential may be applied to each region (106). Note however, that this relationship may be reversed such that the greater the electrical potential applied, the greater the tint exhibited on a corresponding region (106). In this example, to maintain 0% tint, i.e., full transparency, no electrical potential would be applied to the regions (106). While reference is made to particular methods of controlling tint, tint may be controlled in a number of ways using signals from the controller (112). This may include applying an electrical potential and/or current continuously or in a pulsed pattern. In an example, the controller (112) determines a target tint value, or a degree of tint adjustment, for the first region (106) based on a brightness of the virtual content. For example, content that is brighter may trigger a reduced tint level to achieve a target contrast while virtual content that is initially less bright may trigger a greater tint value to achieve the target contrast. The determination of the brightness of the virtual content may be achieved in a variety of ways. For example, the controller (112) may determine virtual content characteristics via imaging processing using red, green, blue (RGB) values and other operations to determine overall brightness, contrast, and coloration, etc. As a particular example, the controller (112) may determine the L* value from the CIELAB color space which is indicative of the brightness of the virtual content. In any of these examples, the controller (112) may determine an overall, averaged, weighted, or targeted brightness for the virtual content and may adjust the tint in each region (106) accordingly, with brighter virtual content resulting in a reduced tint level as compared to less bright virtual content.

In an example, the controller (112) determines the tint level based on other input. For instance, the AR display device (100) may include an ambient light sensor. As described above, ambient light impacts the viewability of the virtual content. Specifically, in bright conditions, where there is less contrast, the tint level is set at a higher level along the range, e.g., 80% to provide the desired contrast. By comparison, in lower light conditions, where there is already more contrast, the tint is set to a lower level (e.g., 50%) which is more light transmissive. In this example, the controller (112) accounts for ambient light characteristics in determining a degree of tint wherein a brighter ambient light results in a greater tint level, (i.e., darker tint) for the lens regions (106) to achieve a target contrast.

In an example, the controller (112) determines the tint level based on where in the field of view the virtual content is to be displayed. For example, if the virtual content is to be presented within the user's peripheral field of view, the controller (112) may darken the regions (106) more than if the virtual content were to be presented in the central field of view of the user. This may be done to reduce the impact of increased tint in those regions that are within the central field of view of the user.

In an example, the controller (112) may determine the tint level based on the color properties of the virtual content. For instance, if the virtual content includes a high-contrast, or vibrant, color, the tint level may be less (i.e., more transparent) than if the colors in the virtual content have a less noticeable appearance.

In an example, the controller (112) determines the tint level based on the contrast properties of the virtual content. For example, if the virtual content initially has high contrast (e.g., alternating black and white lines), the virtual content may already be easily visible in ambient conditions such that a reduced amount of tint may be sufficient. By comparison, if the virtual content itself is not a high-contrast image, e.g., it includes different shades of one color, a greater increase in the amount of tint may be triggered to achieve the desired contrast for the virtual content and its immediate surroundings.

As compared with other solutions, the present AR display device (100) provides for localized adjustments of tint. Doing so ensures that virtual content in particular locations has a contrast ratio that lends to the viewability of the virtual content while allowing an increased amount of light to pass through non-virtual content regions (106) of the lens (104) to increase the viewability of the real-world contents through the lens (104).

FIG. 2 is a diagram of the AR display device (100) with independently adjustable tint regions (106), according to an example of the principles described herein. Specifically, FIG. 2 depicts an isometric view of the AR display device (100). FIG. 2 clearly depicts the frame (102) with the lens (104) inserted therein. FIG. 2 also depicts the controller (112) and input (108). In FIG. 2, the input (108) and controller (112) are depicted in dashed lines to represent their location internal to, and integrated with, the frame (102). In other examples, the controller (112) may be on a separate device and remotely located from the frame (102) and other components of the AR display device (100). FIG. 2 also depicts the imaging system (110), which in the example of FIG. 2 includes a projecting unit which projects the virtual content onto the lens (104). FIG. 2 also depicts other components of the AR display device (100).

As described above, the tint in each region (106) is adjusted by applying an electrical potential to that region (106). Accordingly, the AR display device (100) includes electrical traces (216) to connect the controller (112) to each region (106) of the lens (104). That is, each region (106) of the grid of regions (106) may be individually electrically connected to the controller (112) to receive tint adjusting electrical potentials. Specifically, each region (106) may be addressed as a row and a column, with row traces and column traces attaching to switches, such as transistor switches, for each row and column. On the lens (104) itself, these electrical traces (216) may be microscopic and/or transparent such that they are not visible to the naked eye and do not obstruct the view of the real world through the lens (104).

As described above, tint adjustments may also be based on additional conditions such as the ambient lighting of the environment in which the AR display device (100) is used. That is, ambient brightness may impact the viewability of the virtual content. For example, brighter ambient light may wash out projected virtual content making it more difficult to see. Accordingly, the AR display device (100) may include an ambient light sensor (214) to detect a brightness of ambient light. In an example, the ambient light sensor (214) may be a color camera or any other type of photodetector that is to sense the amount of ambient light present. Light brightness may be detected in a variety of ways. In one example, a sensor may record the characteristics of light based on its red, green, and blue (RGB) qualities. In another example, the ambient light sensor (214) may record the characteristics of light in other "spaces." One such example is the CIELAB color space which defines light based on its red, green, yellow, and blue qualities. The CIELAB color space also has a value L* which is indicative of the lightness of the light. Accordingly, an ambient light sensor (214) that operates in the CIELAB color space may define the light in terms of its L* value such that an ambient brightness for the whole physical scene within the field of view of the ambient light sensor (214) may be determined.

As described above, this measured brightness value serves as a basis for a tint adjustment to the regions (106) of the lens (104). Accordingly, the controller (112) may determine a degree of tint for the first region (i.e., a region on which virtual content is to be presented) based on a detected brightness of the ambient light. In an example, the tint-adjusting ambient light brightness value may be an averaged value across the ambient light sensor (214) field of view, a value where measurements near a central portion of the field of view are more heavily weighted, or a targeted value where measurements at some predetermined or user-selected region of the field of view are more heavily weighted.

Note that while FIG. 2 depicts a particular configuration of the components, different configurations are anticipated by the present disclosure. For example, while FIG. 2 depicts a particular position within the frame (102) of the controller (112), imaging system (110), input (108), and ambient light sensor (214), these components may be placed elsewhere on the AR display device (100). Moreover, while FIG. 2 depicts the AR display device (100) as having a glasses-type frame (102), the AR display device (100) may include frames (102) having a different form factor, such as a headset.

Figure 3:
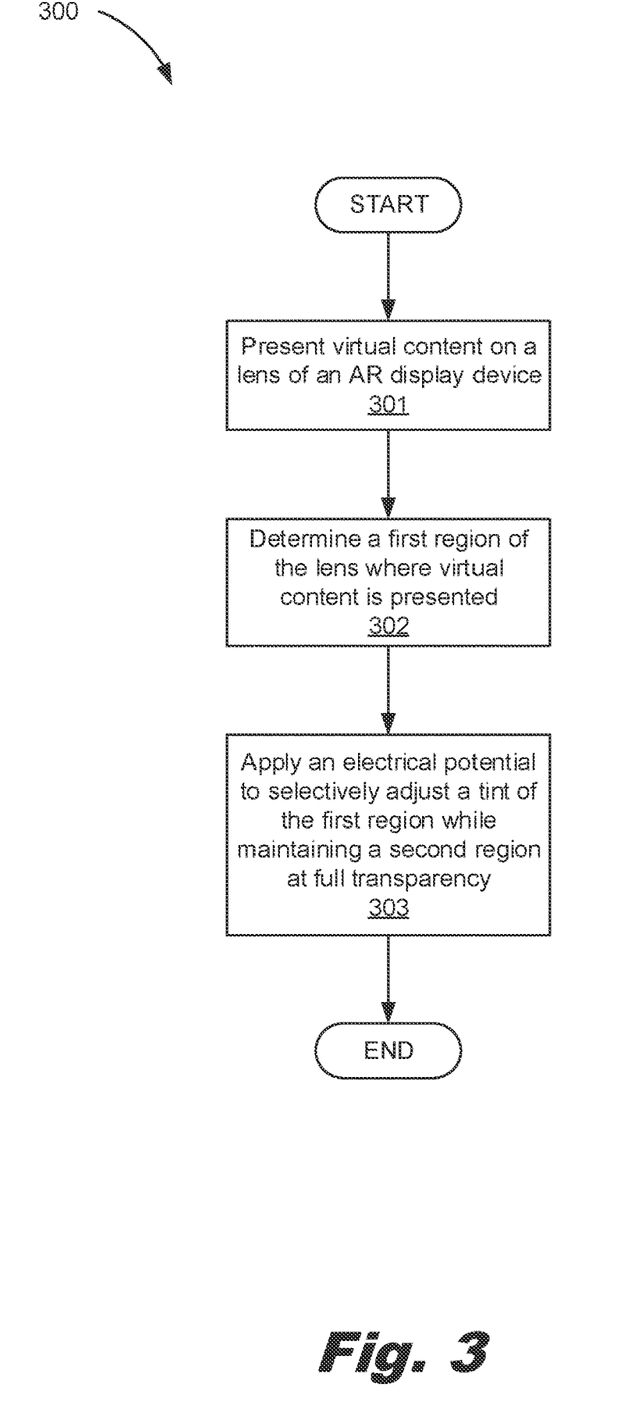
FIG. 3 is a flow chart of a method for selectively adjusting a tint in different lens regions, according to an example of the principles described herein.

FIG. 3 is a flow chart of a method (300) for selectively adjusting a tint in different lens regions (106), according to an example of the principles described herein. According to the method (300), the imaging system (110) presents (block 301) virtual content on a lens (104) of an AR display device (100). As described above, the imaging system (110) may implement any number of modalities to superimpose virtual content over a real-world environment. This may include a projecting unit and liquid crystal optical components to reflect an image towards a user's eye.

The controller (112) of the AR display device (100) determines (block 302) a first region (106) of the lens where virtual content is to be presented. That is, as described above, just regions (106) of the lens (104) where virtual content is to be presented may have their tint adjusted to achieve a target contrast for optimized presentation of the virtual content. Accordingly, the controller (112) determines those regions (106) where the virtual content is to be presented such that those regions (106) may have their tint level set.

This may be performed in a variety of ways. For example, the controller (112) may identify pixel addresses for the pixels of the virtual content. That is, each pixel of the virtual content is identified with coordinates that identify the pixel's location on the lens (104). In an example, these coordinates may be obtained from the metadata associated with the virtual content or otherwise provided by a content source. In another example, the pixel coordinates may be obtained by detecting which pixels, or which locations, on the lens (104) have virtual content projected thereon. The controller (112) may then map pixel addresses of the virtual content to regions (106) of the lens (104). That is, similar to pixels of the virtual content, regions (106) of the lens (104) may be identified with coordinates that identify each region's relative location on the lens (104). As such, upon receiving and presenting the virtual content, the controller (112) may map the pixel coordinates to the region coordinates to identify which regions (106) are active, i.e., have virtual content presented thereon.

In some examples, determination (block 302) of the first region may be based on a bounding region surrounding the virtual content. That is, virtual content may have irregular boundaries. Accordingly, rather than increasing the tint in an irregular outline surrounding the virtual content, the controller (112) may identify a bounding region surrounding the virtual content and may increase the tint of regions (106) within the identified bounding region. Accordingly, in this example, the processor of the controller (112) may identify a bounding region around the virtual content. During this operation, the controller (112) identifies a smallest rectangular boundary that surrounds the virtual content. The controller (112) then identifies the pixel addresses of the bounding region. That is, the smallest rectangular boundary that surrounds the virtual content, like the pixels of the virtual content and regions (106) of the lens (104), may be identified by its coordinates in a coordinate plane. With the coordinates of the bounding region identified, the controller (112) may identify the region(s) upon which virtual content is to be presented based on a mapping between pixel addresses of the bounding region and the regions (106) of the lens (104). That is, the processor of the controller (112) may determine which regions (106) of the lens (104) have coordinates that overlap with the coordinates of the bounding region.

The controller (112) then applies (block 303) an electrical potential to produce an electrical field across the first region (106) to selectively adjust a tint of the first region (106). Specifically, the amount of tint in the first region (106) may be set such that light transmissivity through the first region (106) is reduced. Doing so increases the contrast between light passing through the first region (106) and the virtual content presented thereon. As such, this virtual content is more easily viewed on the lens (104).

As described above, increasing the tint may make objects in the physical world more difficult to view due to the decreased light transmissivity through a tinted surface. Accordingly, the controller (112) may tint just those regions with virtual content presented thereon and maintain a second region (106) at full transparency. Put another way, a tint level of a region (106) is set more dark, responsive to an indication that virtual content is to be presented on the region (106). Doing so may ensure that non-virtual content regions (106) of the lens (104) are setup to optimize light transmission and real-world viewability. As such, the present method (300) optimizes virtual content viewability in regions (106) where virtual content is present and optimizes viewing of a physical environment in regions (106) where virtual content is not presented and a contrast adjustment is not necessary.

FIGS. 4A and 4B depict the selective tint adjustment on an AR display device (100), according to an example of the principles described herein. In the example depicted in FIGS. 4A and 4B, the scene includes real-world elements of a lake and mountains with virtual content (418) of chevron arrows pointing left with the phrase "Point of Interest." As described above, this virtual content (418) may be received at an input (108) and generated on the lens (104) of the frame (102) via the imaging system (110). As indicated above, based on the ambient conditions, the virtual content (418) may not have sufficient contrast with the background to be easily viewed. For example, the natural light of an outdoor scene on a sunny day such as that depicted in FIG. 4A, may wash out the virtual content (418) presented on the lens (104). That is, viewability of virtual content (418) is dependent upon a contrast of the virtual content (418) against the background on which it is displayed, which in this case is a physical scene viewable through the lens (104). This is exacerbated if the virtual content (418) has a same coloration as the physical scene. For example, the chevron arrows in FIG. 4A may be blue, such that they may be indistinguishable, or hard to distinguish, from the blue lake over which the chevron arrows are superimposed.

Accordingly, as described herein, the controller (112) determines which regions (106) of the lens (104) map to the pixel addresses of the virtual content (418), or a bounding region surrounding the virtual content (418), and sets the tint level in these regions (106) as depicted in FIG. 4B such that they are darker and provide the desired contrast. Making these regions (106) darker, i.e., increasing the tint, provides a contrast which makes the virtual content (418) stand out more than if these regions (106) were un-tinted. As such, the present specification describes AR display devices (100) that alter the properties of a lens (104) in regions where the virtual content (418) is to be presented such that this virtual content (418) stands out against its background. Note that as depicted in FIG. 4B, regions (106) where virtual content (418) is not presented are not adjusted. Accordingly, the physical scene viewed in these non-virtual content regions (106) passes to the user's eye unaltered.

Note that in some examples, the controller (112) generates a tint gradient away form a border of the virtual content (418) or away from a bounding region surrounding the virtual content (418). Such a gradient, or feathering, may create a more natural or gradual transition from the tinted regions (106) to the un-tinted regions (106) which is not as abrupt as a hard and sharp transition. As such, feathered transition region may be less disruptive to the user of the AR display device (100).

Figure 5:
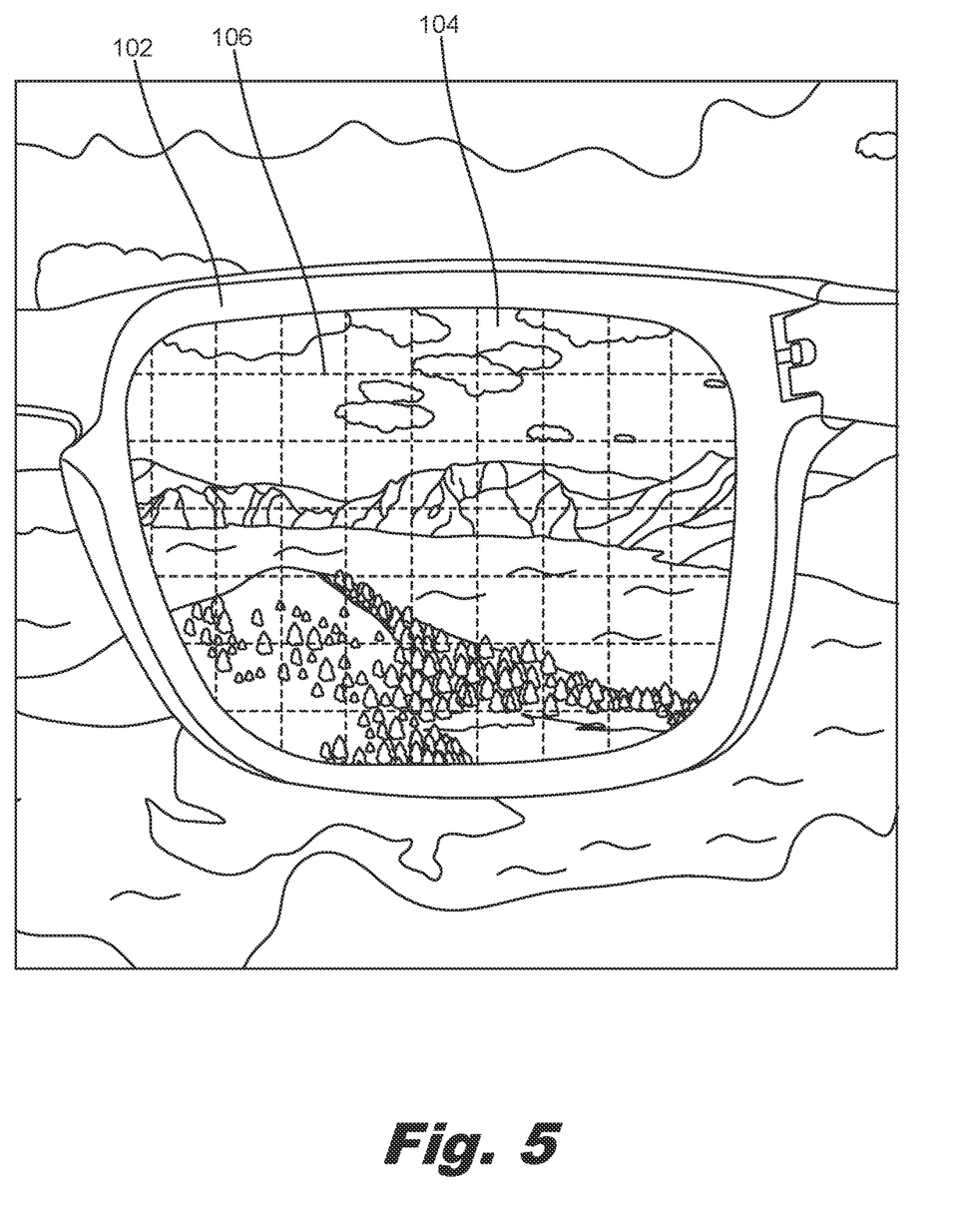
FIG. 5 depicts the tint regions of an AR display device, according to an example of the principles described herein.

FIG. 5 depicts the tint regions (106) of an AR display device (100), according to an example of the principles described herein. As described above, the lens (104) of the AR display device (100) is divided into regions (106), each of which is individually addressable and whose tint may be individually adjusted. In FIG. 5, the region (106) demarcations are in dashed lines to indicate their representative nature. That is, these lines denote the regions (106) and are not visible elements to a user.

Note that FIG. 5 depicts enlarged regions (106) for ease of illustration. Each region (106) may range in size from one pixel to larger, for example an area covering ¼ to ½ of the lens (104). For example, where virtual content is to be presented at a set location on the lens (104), a single region (106) may align with that set location. As a particular example, driving directions could always show up in the upper/outer quadrant.

For reference, a single region (106) is identified with a reference number. However as described above, the entire lens (104) may be covered with regions (106). As depicted in FIG. 5, the regions (106) may be defined as a grid across a surface of the lens (104).

As described above, each region (106) may be connected to the controller by electrical traces (216). Specifically, each region (106) may be connected via a row trace and a column trace such that individual regions (106) are uniquely addressed by 1) activating, from a set of row traces, a row trace that corresponds to the particular region (106) and 2) activating, from a set of column traces, a column trace that corresponds to the particular region (106). As such, the controller (112) may target particular regions (106) for tint adjustment when it is determined that virtual content (418) is to be presented on that particular region.

Figure 6:
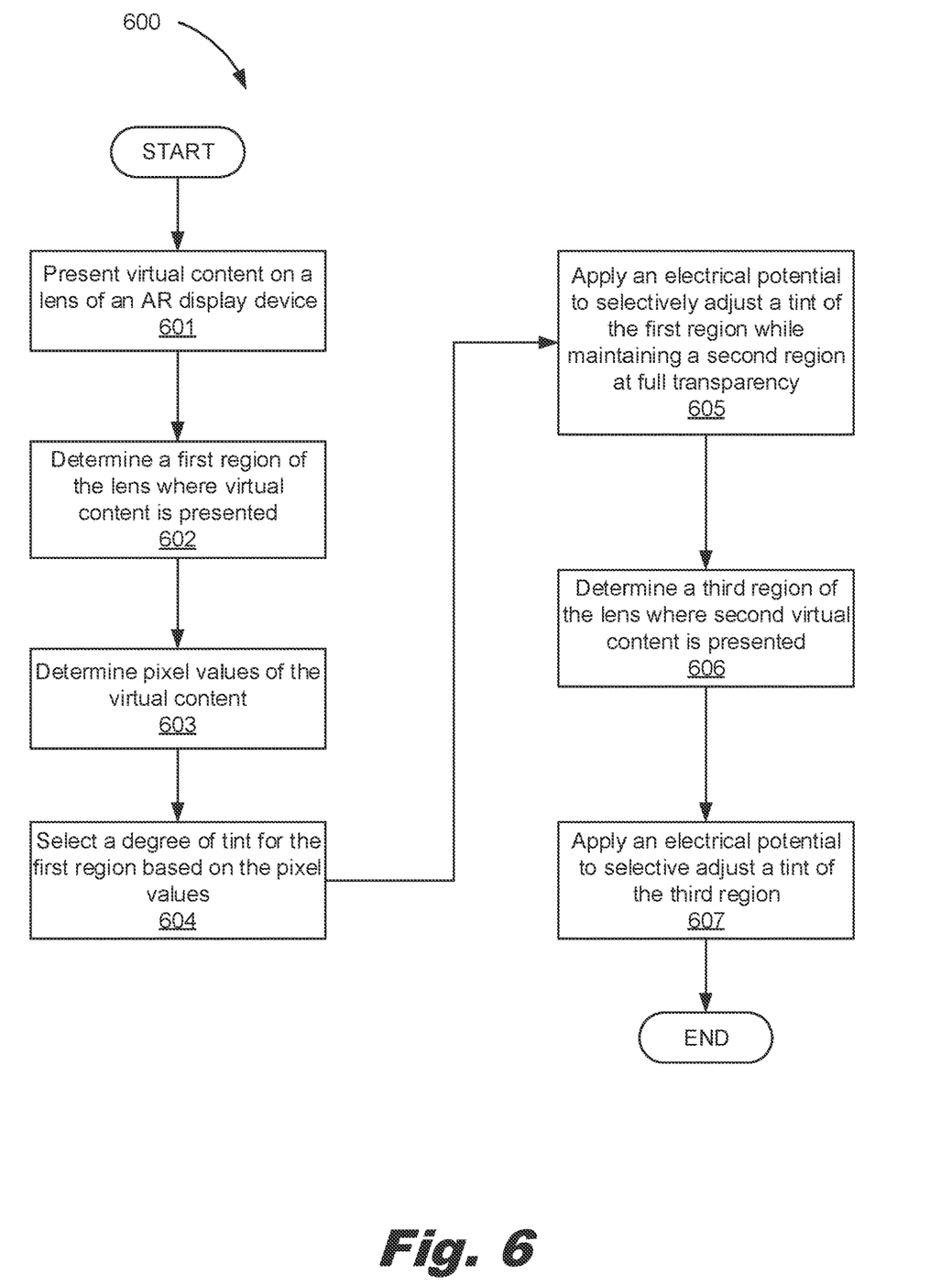
FIG. 6 is a flow chart of a method for selectively adjusting a tint in different lens regions, according to an example of the principles described herein.

FIG. 6 is a flow chart of a method (600) for selectively adjusting a tint in different lens regions (106), according to an example of the principles described herein. According to the method (600), the imaging system (110) presents (block 601) virtual content (418) on a lens (104) of the AR display device (100). This may be performed as described above in connection with FIG. 3. The controller (112) determines (block 602) a first region of the lens (104) where virtual content (418) is to be presented. Again, this may be performed as described above in connection with FIG. 3.

As described above, in some examples, the tint level may be based on a brightness of the virtual content (418). Accordingly, in this example the controller (112) determines (block 603) pixel values of pixels that make up the virtual content (418). This may be performed using any of the abovementioned image processing operations, (e.g., imaging processing using RGB values, L* values, etc. and subsequent processing). In an example, the pixel values of the virtual content (418) may be determined from the metadata associated with the virtual content (418).

Based on determined pixel values for the virtual content (418), the controller (112) selects (block 604) a degree of tint for the first region (106). Accordingly, not only is tint adjusted on a per-region (106) granularity, but tint may also be adjusted specifically based on the properties of the virtual content (418) that is presented.

As described above, the controller (112) may determine an overall, averaged, weighted, or targeted brightness for the virtual content (418). That is, the controller (112) may average pixel values for a group of pixels that make up the virtual content (418) and the selected (block 604) degree of tint for the first region (106) may be based on the averaged pixel value for the virtual content.

The controller (112) then applies (block 605) an electrical potential to selectively set a tint in the first region (106) while refraining from applying an electrical potential to a second region wherein no virtual content (418) is provided. This may be performed as described above in connection with FIG. 3.

Note that in some examples, virtual content (418) may be presented at different locations on the lens (104). For example, in addition to presenting the left-pointing arrows and the phrase "Point of Interest" as depicted in FIG. 4A, the imaging system (110) may present second virtual content in the form of right-pointing arrows and the phrase "Your car" to indicate to a user a location of his/her parked car.

Similar to the presentation of the first virtual content (418), it may be desirable to enhance the contrast of this second virtual content (418). Accordingly, similar operations may be performed to increase the contrast of this second virtual content (418) against its surroundings. Specifically, the controller (112) may determine (block 606) a third region (106) of the lens (104) on which the second virtual content (418) is to be presented and may apply (block 607) an electrical potential to produce an electric field across the third region to selectively adjust a tint for the third region (106). Note that in some cases, a uniform tint adjustment may be supplied to the different virtual content-bearing regions (106), regardless of the properties of the ambient light in those regions (106) and the virtual content presented thereon. However, in some examples, a tint adjustment for the third region (106) may be distinct from the tint adjustment to the first region (106). As an example, the virtual content (418) presented in the first region (106) may be brighter than the virtual content (418) presented in the third region (106), such that the tint in the first region (106) is set to a less tinted state as compared to the virtual content (418) presented in the third region. As another example, the ambient lighting conditions may be different in the first and third regions. Accordingly, the degree to which a tint in these regions is adjusted may also be different. Note that while reference is made to particular considerations that lead to different tint adjustments, a variety of different conditions of both the physical environment and the virtual content (418) may lead to different tint adjustments to different regions (106) of the lens (104). Suffice it to say that such customized tint adjustments are possible via the individually-addressable and adjustable regions (106) of the lens (104).

Figure 7:
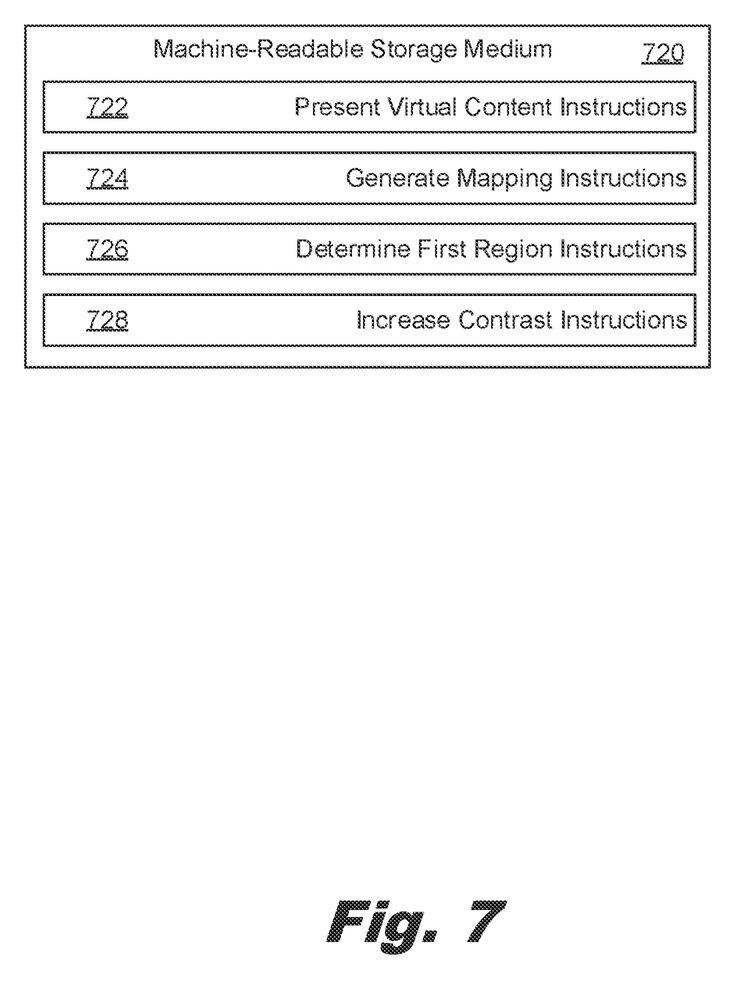
FIG. 7 depicts a non-transitory machine-readable storage medium for selectively adjusting a tint in different lens regions, according to an example of the principles described herein.

FIG. 7 depicts a non-transitory machine-readable storage medium (720) for selectively adjusting a tint in different lens regions (106), according to an example of the principles described herein. To achieve its desired functionality, the AR display device (100) includes various hardware components. Specifically, the AR display device (100) includes a processor and a machine-readable storage medium (720). The machine-readable storage medium (720) is communicatively coupled to the processor. The machine-readable storage medium (720) includes several instructions (722, 724, 726, 728) for performing a designated function. In some examples, the instructions may be machine code and/or script code.

The machine-readable storage medium (720) causes the processor to execute the designated function of the instructions (722, 724, 726, 728). The machine-readable storage medium (720) can store data, programs, instructions, or any other machine-readable data that can be utilized to operate the AR display device (100). Machine-readable storage medium (720) can store machine-readable instructions that the processor of the AR display device (100) can process, or execute. The machine-readable storage medium (720) can be an electronic, magnetic, optical, or other physical storage device that contains or stores executable instructions. Machine-readable storage medium (720) may be, for example, Random-Access Memory (RAM), an Electrically Erasable Programmable Read-Only Memory (EEPROM), a storage device, an optical disc, etc. The machine-readable storage medium (720) may be a non-transitory machine-readable storage medium (720).

Referring to FIG. 7, present virtual content instructions (722), when executed by the processor, cause the processor to present virtual content (418) on a lens (104) of the AR display device (100) wherein the lens (104) includes multiple individually-addressable and individually-adjustable regions (106). Generate mapping instructions (724), when executed by the processor, cause the processor to, generate a mapping between pixel addresses of the virtual content (418) to regions (106) of the lens (104). Determine first region instructions (726), when executed by the processor, cause the processor to, determine a first region (106) of the lens (104) on which the virtual content (418) is to be presented. Increase contrast instructions (728), when executed by the processor, cause the processor to increase contrast between a physical scene viewable through the lens (104) and the virtual content (418) in a first region (106) by 1) applying an electrical potential to generate an electrical field across the first region (106) and 2) suppressing an electrical potential from a second region where virtual content (418) is not presented.

In summary, such a device, method, and machine-readable storage medium may, for example, 1) provide a target contrast between virtual content and real-world physical objects viewable through an AR display device; 2) is lightweight; 3) automatically adjusts the contrast without user intervention; 4) localizes the target display conditions for virtual content to regions surrounding the virtual content, and 5) leaves non-virtual content regions of the transparent lens unaffected by the reduced light. However, it is contemplated that the devices disclosed herein may address other matters and deficiencies in a number of technical areas.

What is claimed is:

1. An augmented reality (AR) display device, comprising:
 a frame to be worn on a head of a user;
 a lens disposed within the frame, wherein:
   the user is to view a physical scene through the lens;
   the lens comprises multiple regions;
   each region is individually addressable; and
   a tint in each region is individually adjustable;
 an input to receive virtual content to be presented on the lens;
 an imaging system to present the virtual content on the lens; and
 a controller to:
   identify a first region of the lens on which the virtual content is to be presented; and selectively adjust a tint of the first region by applying an electrical potential to produce an electric field across the first region while suppressing a tint adjustment to a second region of the lens,
    wherein a degree of the tint to be selectively adjusted for the first region is based on pixel values of pixels that make up the virtual content to be presented, and the controller is to determine the pixel values of the virtual content from metadata associated with the virtual content.

2. The AR display device of claim 1, wherein the tint of the first region is set to be darker responsive to an indication that the virtual content is to be presented on the first region.

3. The AR display device of claim 1, further comprising electrical traces to connect the controller to each region of the lens, wherein the electrical traces are transparent.

4. The AR display device of claim 1, wherein the regions are defined as a grid across a surface of the lens.

5. The AR display device of claim 1, wherein the controller is to determine a degree of a tint adjustment for the first region based on a brightness of the virtual content.

6. The AR display device of claim 1:
    further comprising an ambient light sensor to detect a brightness of ambient light; and
    wherein the controller is to determine a degree of a tint adjustment for the first region based on a detected brightness of ambient light.

7. The AR display device of claim 1, wherein the controller is to generate a tint gradient away from a border of the virtual content.

8. The AR display device of claim 1, wherein the degree of the tint to be selectively adjusted for the first region is further based on an averaged pixel value of the virtual content from averaging the pixel values that make up the virtual content to be presented.

9. The AR display device of claim 1, wherein to identify the first region includes to:
    identify a bounding region around the virtual content,
    identify pixel addresses of the bounding region, and
    identify the first region based on a mapping between the pixel addresses of the bounding region and the regions of the lens.

10. A method, comprising:
    presenting virtual content on a lens of an augmented reality (AR) display device wherein:
        a user is to view a physical scene through the lens;
        the lens comprises multiple regions;
        each region is individually addressable; and
        a tint in each region is individually adjustable;
    determining a first region of the lens on which the virtual content is presented;
    averaging pixel values for a group of pixels that make up the virtual content to be presented;
    selecting a degree of tint increase for the first region based on an averaged pixel value of the virtual content; and
    applying an electrical potential to produce an electric field across to the first region to selectively adjust a tint of the first region according to the selected degree of tint increase while suppressing an electrical potential across a second region.

11. The method of claim 10, further comprising:
    determining pixel values of pixels that make up the virtual content to be presented; and
    selecting a degree of tint increase for the first region based on the pixel values of the virtual content.

12. The method of claim 11, wherein the pixel values of the virtual content are determined from metadata associated with the virtual content.

13. The method of claim 10, further comprising:
    determining a third region of the lens on which second virtual content is to be presented; and
    applying an electrical potential to produce an electric field across the third region to selectively adjust a tint of the third region, wherein a tint adjustment for the third region is distinct from a tint adjustment for the first region.

14. The method of claim 10, wherein determining the first region of the lens on which the virtual content is to be presented comprises:
    identifying pixel addresses for pixels of the virtual content; and
    mapping pixel addresses of the virtual content to regions of the lens.

15. The method of claim 10, wherein determining the first region of the lens on which the virtual content is to be presented comprises:
    identifying a bounding region around the virtual content;
    identifying pixel addresses of the bounding region; and
    identifying the first region based on a mapping between pixel addresses of the bounding region and regions of the lens.

16. A non-transitory machine-readable storage medium encoded with instructions executable by a processor, the machine-readable storage medium comprising instructions to, when executed by the processor, cause the processor to:
    present virtual content on a lens of an augmented reality (AR) display device wherein:
        a user is to view a physical scene through the lens;
        the lens comprises multiple regions;
        each region is individually addressable; and
        a tint in each region is individually adjustable;
    generate a mapping between pixel addresses of the virtual content to regions of the lens;
    determine a first region of the lens on which the virtual content is to be presented, including to:
        identify a bounding region around the virtual content,
        identify pixel addresses of the bounding region, and
        identify the first region based on a mapping between the pixel addresses of the bounding region and the regions of the lens; and
    increase contrast between the physical scene viewable through the lens and the virtual content in the first region by:
        applying an electrical current to the first region; and
        suppressing a current from passing to a second region where virtual content is not to be presented.

17. The non-transitory machine-readable storage medium of claim 16, wherein applying an electrical current to the first region adjusts a tint of the first region, and further comprising instructions to, when executed by the processor, cause the processor to:
    determine pixel values of pixels that make up the virtual content to be presented, wherein the pixel values of the virtual content are determined from metadata associated with the virtual content; and
    select a degree of tint increase for the first region based on the pixel values of the virtual content.

18. The non-transitory machine-readable storage medium of claim 16, wherein applying an electrical current to the first region adjusts a tint of the first region, and further comprising instructions to, when executed by the processor, cause the processor to:

average pixel values for a group of pixels that make up the virtual content to be presented; and select a degree of tint increase for the first region based on an averaged pixel value of the virtual content.

\* \* \* \* \*